(12) United States Patent
Gish et al.

(10) Patent No.: US 11,280,755 B2
(45) Date of Patent: Mar. 22, 2022

(54) REFERENCE ELECTRODES FORMED PRIOR TO PERFORMANCE OF MEASUREMENTS

(71) Applicant: HEWLETT-PACKARD DEVELOPMENT COMPANY, L.P., Spring, TX (US)

(72) Inventors: Sarah Gish, Corvallis, OR (US); Tod Woodford, Corvallis, OR (US); Alexander Govyadinov, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/608,322

(22) PCT Filed: Apr. 26, 2018

(86) PCT No.: PCT/US2018/029586
§ 371 (c)(1),
(2) Date: Oct. 25, 2019

(87) PCT Pub. No.: WO2019/209302
PCT Pub. Date: Oct. 31, 2019

(65) Prior Publication Data
US 2021/0072178 A1    Mar. 11, 2021

(51) Int. Cl.
*G01N 27/327* (2006.01)
*C25D 5/02* (2006.01)
(Continued)

(52) U.S. Cl.
CPC .......... *G01N 27/301* (2013.01); *C23C 18/42* (2013.01); *C25D 5/02* (2013.01); *G01N 27/3275* (2013.01); *G01N 27/333* (2013.01)

(58) Field of Classification Search
CPC .... G01N 27/327–3272; G01N 27/3275–3278; C25D 5/02; C25D 5/00
See application file for complete search history.

(56) References Cited

U.S. PATENT DOCUMENTS

| 4,871,439 A * | 10/1989 | Enzer | G01N 33/492 204/401 |
|---|---|---|---|
| 6,063,259 A | 5/2000 | Wang et al. | |

(Continued)

FOREIGN PATENT DOCUMENTS

WO    WO2014015333 A1    1/2014

OTHER PUBLICATIONS

Baldwin et al., "Fully Integrated On-Chip Electrochemical Detection for Capillary Electrophoresis in a Microfabricated Device," Anal. Chem. 2002, 74, 3690-3697 (Year: 2002).*

(Continued)

*Primary Examiner* — Alexander S Noguerola
(74) *Attorney, Agent, or Firm* — Perry + Currier Inc

(57) ABSTRACT

An example device includes a processor to connect to an electrode disposed within a microfluidic volume and to connect a second electrode that includes a surface of silver metal disposed within the microfluidic volume. The processor is to apply an electrical potential between the electrode and the second electrode when the microfluidic volume contains a fluid that contains chloride ions to form a layer of silver chloride on the surface of the second electrode. The processor is further to cease application of the electrical potential and operate the second electrode as a reference electrode in a measurement process performed within the microfluidic volume.

12 Claims, 10 Drawing Sheets

(51) Int. Cl.
*G01N 27/30* (2006.01)
*C23C 18/42* (2006.01)
*G01N 27/333* (2006.01)

(56) References Cited

U.S. PATENT DOCUMENTS

| | | | | |
|---|---|---|---|---|
| 7,470,547 | B2* | 12/2008 | Tisone | B01D 19/0047 |
| | | | | 436/180 |
| 8,702,959 | B2 | 4/2014 | Shacham-Diamand et al. | |
| 9,494,554 | B2 | 11/2016 | Davis et al. | |
| 2002/0079219 | A1* | 6/2002 | Zhao | B81B 7/007 |
| | | | | 204/451 |
| 2002/0090649 | A1* | 7/2002 | Chan | G01N 33/5438 |
| | | | | 435/7.1 |
| 2007/0099211 | A1 | 5/2007 | Aivazachvili et al. | |
| 2008/0118987 | A1 | 5/2008 | Eastwood et al. | |
| 2011/0056831 | A1 | 3/2011 | Kendig et al. | |
| 2011/0240752 | A1 | 10/2011 | Meacham et al. | |
| 2013/0164748 | A1 | 6/2013 | Aivazachvili et al. | |
| 2015/0141272 | A1 | 5/2015 | Gordon | |
| 2015/0226689 | A1 | 8/2015 | Semancik et al. | |
| 2017/0342508 | A1 | 11/2017 | Harris et al. | |

OTHER PUBLICATIONS

General Chemistry Online article entitled "What's the easiest way to get pure Ag from AgNO3?") by Fred Senese, 2010, downloaded from https://antoine.frostburg.edu/chem/senese/101/redox/faq/ag-from-agno3.shtml on Jul. 12, 2021 (Year: 2010).*

Sodergren, Simon, Electrochemical microsensor with in-situ fabricated Ag/AgCl reference electrode for high pressure microfluidics, Uppsala Universitet, Sep. 2017.

Shinwari et al., Microfabricated Reference Electrodes and their Biosensing Applications. Sensors. ISSN 1424-8220.

Mokhov A.G., Measurement of Electrode Potential in Aqueous Electrolyte Solutions, Usurt, Ekaterinburg, 2007, 12 pages, p. 9, fig. 2. No EN translation available.

Salm, Eric et al., "Electrical Detection of Nucleic Acid Amplification Using an On-Chip Quasi-Reference Electrode and a PVC REFET", Jun. 18, 2014; Analitical Chemistry.

* cited by examiner

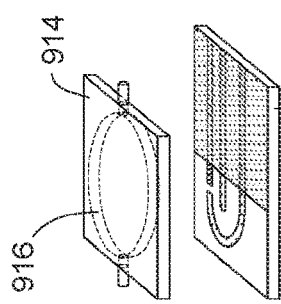
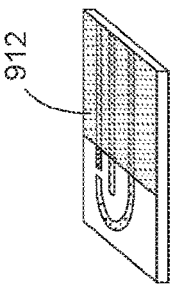
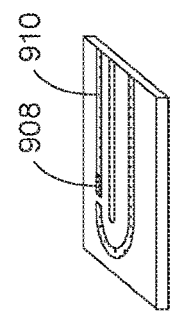
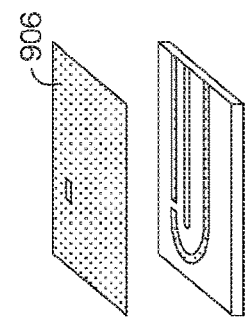
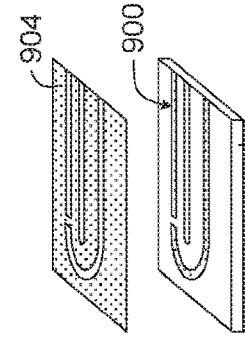
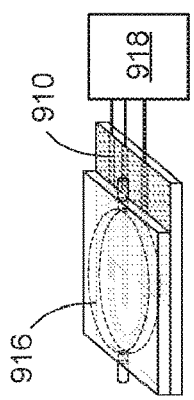
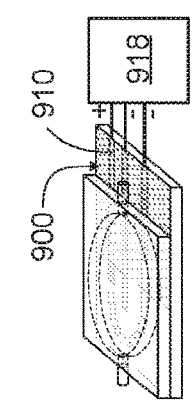
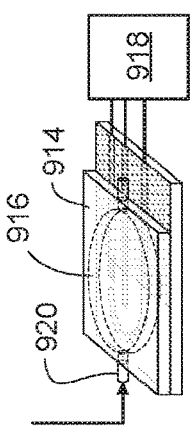

REFERENCE ELECTRODES FORMED PRIOR TO PERFORMANCE OF MEASUREMENTS

BACKGROUND

Reference electrodes are used in electrochemical measurements. A reference electrode is typically stable and has a well understood electrode potential. A silver/silver chloride reference electrode is an aqueous reference electrode that finds use in a wide variety of applications.

BRIEF DESCRIPTION OF THE DRAWINGS

FIGS. 9A-9I are schematic diagrams of an example method to manufacture a microfluidic device, form a reference electrode, and perform a measurement with the reference electrode.

DETAILED DESCRIPTION

Figure 1:
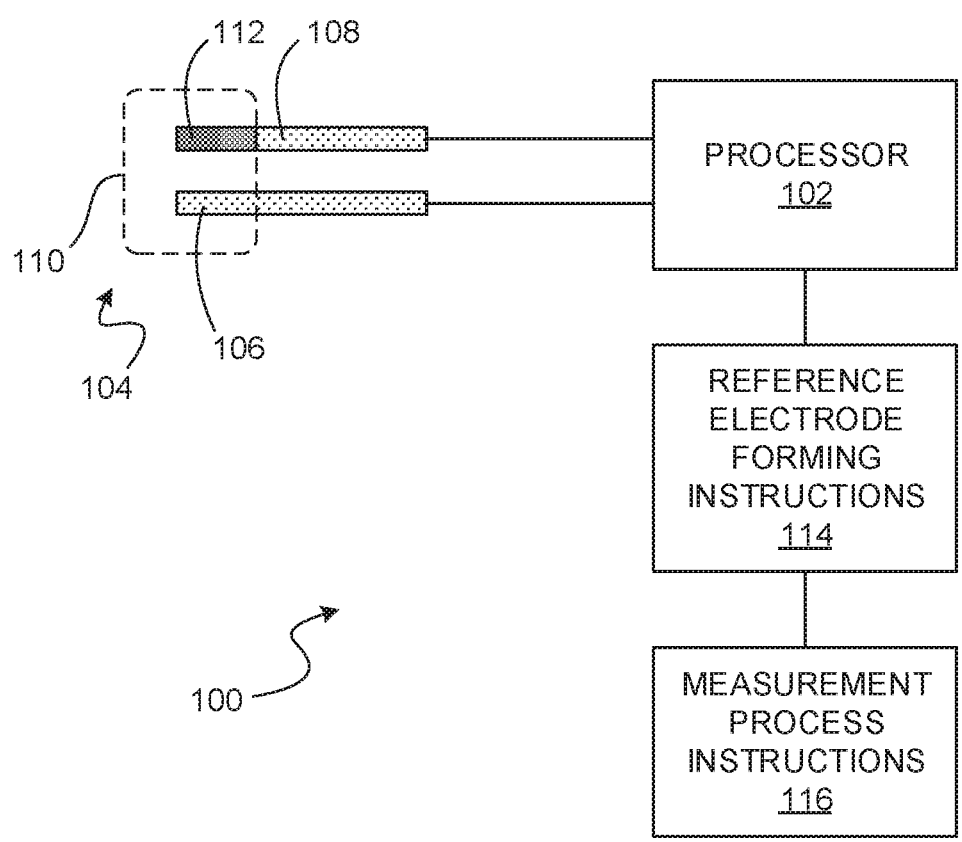
FIG. 1 is a schematic diagram of an example device to form a reference electrode and perform a measurement.

Including a silver/silver chloride reference electrode in a microfluidic device at time of manufacture may add complexity to a microfluidic device manufacturing process. For example, the manufacturing process, which may otherwise be "dry", may have to be adapted to use a wet chloride solution to provide chloride ions to fabricate the silver/silver chloride reference electrode. Further, a silver/silver chloride reference electrode may have a limited shelf life and may suffer degradation over time due to, for example, light sensitivity and chloride leakage.

A silver/silver chloride reference electrode may be fabricated within a microfluidic device before use of the microfluidic device to perform a process, such as a nucleic acid amplification process or other process that uses a stable reference electrode.

The reference electrode is formed in situ, such that the same reaction volume is used both to form the reference electrode and to perform a measurement for the process. A reagent normally used in the process may also be used to provide chloride ions for electrochemical deposition of silver chloride to form the reference electrode.

An electrode having layer of metal, such as silver, may be provided to a reaction volume when the microfluidic device is manufactured. Later, when the device is to be used, a fluid containing anions, such as chloride ions, may be provided to the reaction volume and a voltage may be applied between the electrode having the layer of metal and another electrode. The layer of metal may become anodized to finish the electrode. For example, silver chloride may form on the silver metal, thereby transforming the electrode into a silver/silver chloride reference electrode. Thereafter, the newly formed reference electrode may be used within the same reaction volume to perform a process that takes a measurement.

Example measurements include a potentiometric measurement, an amperometric measurement, impedimetric measurement, cyclic voltammetry, square wave voltammetry, and similar. The reference electrode may be used with a chemical field-effect transistor (ChemFET), an ion-selective field-effect transistor, and similar.

Examples of processes that may use the reference electrode include a nucleic acid amplification process, such as a polymerase chain reaction (PCR), a real-time or quantitative polymerase chain reaction (qPCR), a reverse transcription polymerase chain reaction (RT-PCR), a loop mediated isothermal amplification (LAMP), a recombinase polymerase amplification (RPA), a polymerase spiral reaction (PSR), transcription-based amplification, a self-sustained sequence replication reaction (3SR), nucleic acid sequence-based amplification (NASBA), strand displacement amplification (SDA), rolling circle replication (RCR), helicase-dependent amplification (HDA), single primer isothermal amplification (SPIA), cross-priming amplification, and similar.

The fluid used to fabricate the reference electrode in situ may be a PCR master mix that contains magnesium chloride ($MgCl_2$) as a source of chloride ions for the formation of silver chloride. The same fluid, which may be slightly depleted of chloride ions, may be used in a subsequent PCR process, in which the reference electrode is used to make a measurement. The same may apply to other types of nucleic acid amplification processes or other measurement processes in general.

A microfluidic device may thus be fabricated with an unfinished reference electrode, which is finished prior to use of the device. Depositing a layer of silver metal does not unduly increase complexity of a manufacturing process for the microfluidic device. Further, the reference electrode will not undergo degradation due to light sensitivity or chloride leakage in the time between manufacture and use.

FIG. 1 shows an example device 100 to form a reference electrode and then perform a measurement process using the formed reference electrode. The device 100 includes a processor 102 that may be connected to a set of electrodes 104.

The device 100 may be an analytical device that connects to different sets of electrodes 104 to perform different measurement processes. Such an analytical device may include a user interface, such as a display, keyboard, or similar. A set of electrodes 104 may be provided in a removable cartridge that may be single use. In other examples, the device 100 may be unitary and may include the processor 102 and the set of electrodes 104 integrated together as a unit.

The set of electrodes 104 includes a first electrode 106 and a second electrode 108. The first electrode 106 is disposed within a microfluidic volume 110. The first electrode 106 may include a metal trace, such as a gold (Au) or platinum (Pt) trace, or a non-metal trace, such as a trace made of carbon (C), polycrystalline silicon (poly-Si), tin oxide ($SnO_{2-x}$), indium tin oxide (ITO), gallium tin oxide (GTO), other metal oxides, and similar. The first electrode 106 may be disposed on a substrate, such as a silicon, glass, or polymer substrate. The term "substrate" as used herein is intended to mean a substrate or a layered structure or stack of substrates, photoresist, or similar materials. Disposing an element on a substrate may include providing the element between different substrates of a layered structure or stack.

The first electrode 106 may include an ion-selective membrane to measure a biological, biochemical, or chemical component of a fluid in contact with the first electrode 106.

The second electrode 108 may include an electrically conductive base material, such as a metal trace (e.g., a gold trace), disposed on a dielectric substrate. The second electrode 108 includes a surface 112 of exposed silver (Ag) metal that is disposed within the microfluidic volume 110. The silver metal surface 112 may be deposited onto the electrically conductive base material to overlie a portion of the electrically conductive base material. The silver metal surface 112 may be made by thin film microfabrication, such as thin film deposition, electroless chemical deposition, electrochemical deposition, screen printing, and similar.

The microfluidic volume 110 may include a passageway, conduit, chamber, or similar volume defined by a substrate. A fluid may be introduced to the microfluidic volume 110 to undergo a measurement process as controlled by the processor 102. Examples of measurement processes include PCR and other discussed elsewhere herein. A fluid, such as a PCR master mix, introduced into the microfluidic volume 110 may contain chloride ions.

The processor 102 may include a central processing unit (CPU), a microcontroller, a microprocessor, a processing core, a field-programmable gate array (FPGA), and/or similar device capable of executing instructions. The processor 102 may cooperate with a non-transitory machine-readable medium that may be an electronic, magnetic, optical, and/or other physical storage device that encodes processor-executable instructions. The machine-readable medium may include, for example, random access memory (RAM), read-only memory (ROM), electrically-erasable programmable read-only memory (EEPROM), flash memory, a storage drive, an optical disc, and/or similar.

The processor 102 applies an electrical potential between the first electrode 106 and the second electrode 108 when the microfluidic volume contains a fluid that contains chloride ions. This applied biasing voltage forms a layer of silver chloride on the surface 112 of the second electrode 108 using the chloride ions, or a quantity thereof. The surface 112 thus may be converted from exposed silver metal (Ag) to silver chloride (AgCl) by anodization and the second electrode 108 may be transformed into a silver/silver chloride reference electrode. Reference electrode forming instructions 114 that are executable by the processor 102 may be provided to cause the processor 102 to apply this reference electrode forming electrical potential.

After creation of the reference electrode, the processor 102 ceases application of the electrical potential and operates the second electrode 108 as the reference electrode in a measurement process performed within the microfluidic volume 110. For example, a potential may be measured by the first electrode 106, which may be considered a working electrode, with respect to the second electrode 108 as the reference electrode. Measurement process instructions 116 that are executable by the processor 102 may be provided to operate the measurement process. Measurement process instructions 116 and reference electrode forming instructions 114 may be part of the same program or may each be provided in different programs, i.e., as part of the same set of executable instructions or code, or as different sets.

The same volume 110 is used both to form the reference electrode and to execute a measurement process. The second electrode 108 formed into a silver/silver chloride reference electrode at its original location or in situ to the microfluidic volume 110. The same processor 102 and executable program may be used. Further, depending on the specific measurement process to be performed, the same fluid may supply chloride ions both to form the reference electrode and to perform the measurement process.

Figure 2:
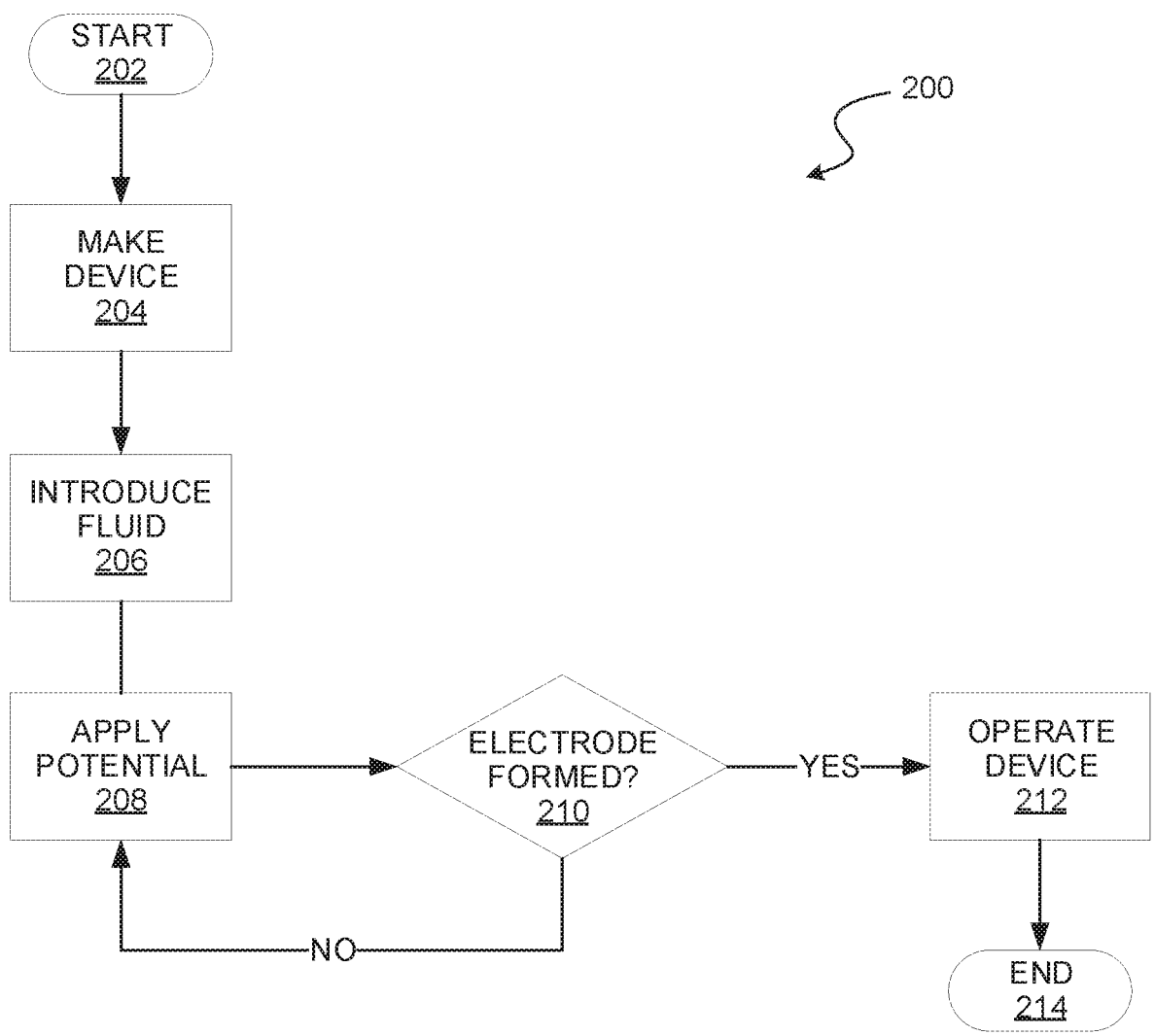
FIG. 2 is a flowchart of an example method to form a reference electrode and perform a measurement.

FIG. 2 shows a method 200 to form a reference electrode and then perform a measurement process using the formed reference electrode. The method 200 may be implemented by processor-executable reference electrode forming instructions and measurement process instructions. The method begins at block 202.

At block 204, a measurement device is manufactured. The device includes a plurality of electrodes positioned within a microfluidic volume. An unfinished or incomplete reference electrode of the plurality of electrodes includes exposed silver metal within the microfluidic volume.

At block 206, a fluid containing chloride ions is introduced to the microfluidic volume. This may be performed when the device is put into use, which may be a significant duration of time (e.g., days, weeks, etc.) after the device is manufactured.

At block 208, an electrical potential is applied between the unfinished reference electrode and another electrode to cause electrochemical formation of silver chloride on the exposed silver metal of the unfinished reference electrode. For example, a voltage of about 1 V may be applied for about 5 seconds. A sufficient formation of silver chloride, as determined by block 210, finishes the reference electrode.

Sufficient formation of silver chloride may be determined by a comparison of an exponential decay of applied current to a threshold current, or similar technique. An example threshold current may be set to between 10 and 100 times lower than an initial current resulting from a constant applied voltage of, for example, 1-2 V. If it is determined that sufficient formation of silver chloride has not occurred, then the electrical potential may continue to be applied until a sufficient formation of silver chloride occurs, as illustrated by block 210.

At block 212, after formation of the complete reference electrode, the device is operated to make a measurement using the plurality of electrodes by, for example, using a working electrode to measure a potential with respect to the newly formed reference electrode. The same fluid volume and the same electrodes may be used both to complete the reference electrode and perform a measurement.

The method 200 ends at block 214. The device may be single use and may be disposed of after completion of the method 200.

Figure 3:
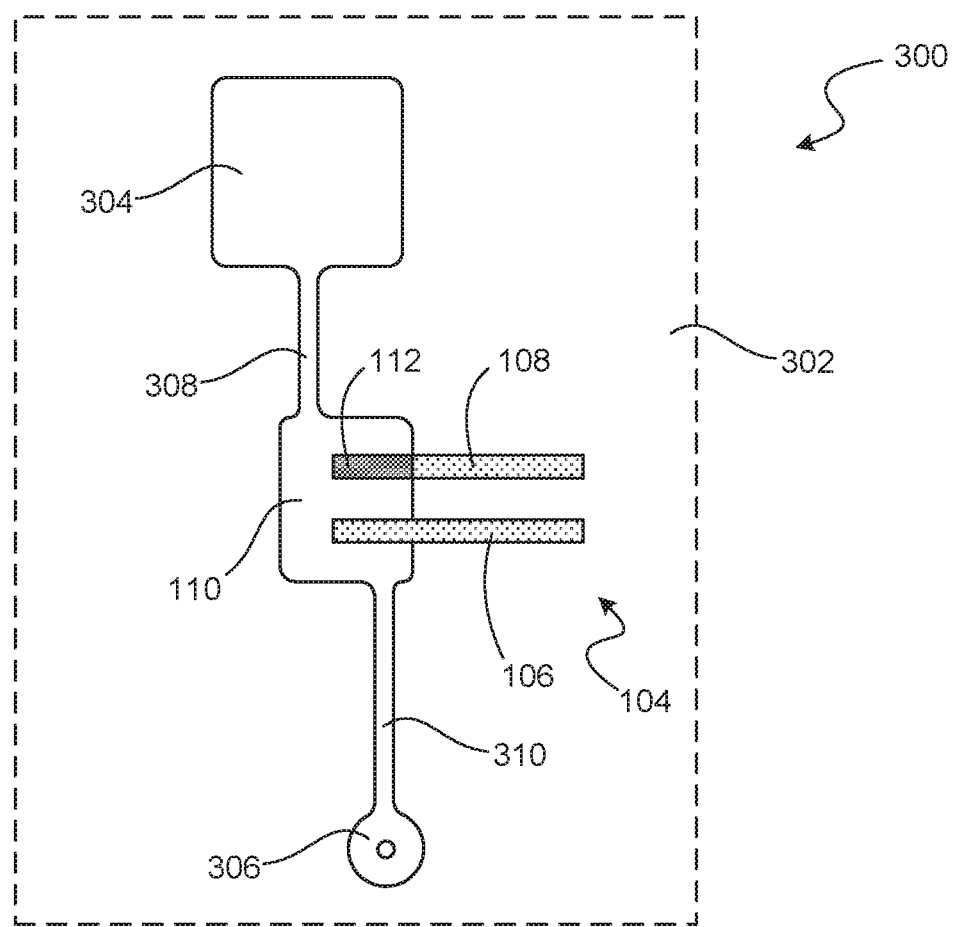
FIG. 3 is a schematic diagram of an example device to form a reference electrode and perform a measurement with a microfluidic reservoir and pump.

FIG. 3 shows an example device 300 to form a reference electrode in situ. Features and aspects of other devices disclosed herein may be used with the device 300. Like reference numerals denote like components and redundant description is omitted for clarity.

The device 100 may include a microfluidic network at a substrate 302. The microfluidic network may include a reservoir 304, a volume 110, and a pump 306. The reservoir 304 may communicate fluid to the volume 110 via an inlet conduit 308. The volume 110 may communicate fluid to the pump 306 via an outlet conduit 310. The pump 306 may include a droplet ejector nozzle, such as a thermal inkjet nozzle (TIJ) or piezoelectric ejector nozzle, or similar device to draw fluid from the reservoir 304 into the volume 110 by creating low pressure at the outlet conduit 310.

A set of electrodes 104 including a first electrode 106 and a second electrode 108 may be provided to the volume 110. The second electrode 108 may include an exposed silver metal surface 112. A fluid that contains chloride ions may be provided to the reservoir 304 and when such fluid is drawn into the volume 110 by action of the pump 306, an electrical potential may be applied between the first electrode 106 and the second electrode 108 to form a layer of silver chloride on the surface 112 of the second electrode 108 to create a silver/silver chloride reference electrode.

Fluid from the reservoir 304 may continue to be pumped to perform a measurement process in the volume using the just-formed reference electrode.

In other examples, different fluids may be provided to the volume 110 from a plurality of different reservoirs 304. A valve or similar mechanism may be used to control which fluid is provided to the volume 110 at a given time.

Figure 4:
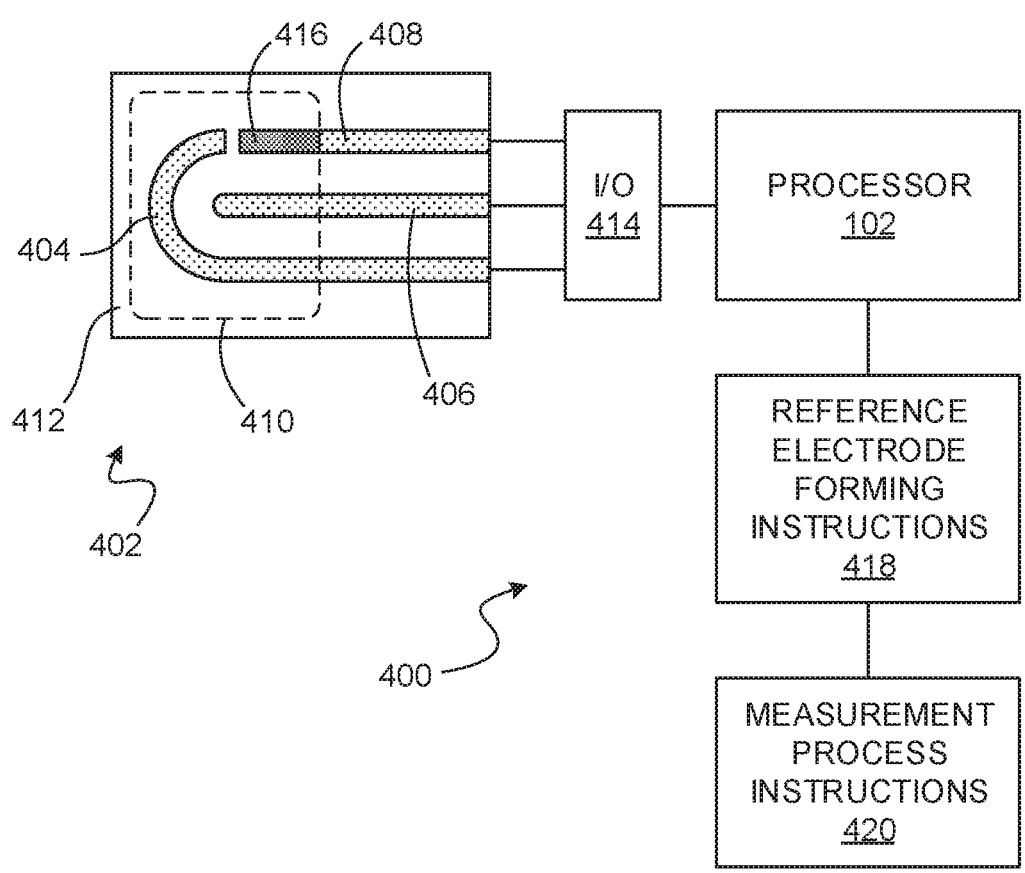
FIG. 4 is a schematic diagram of an example device to form a reference electrode and perform a measurement using three example electrodes.

FIG. 4 shows an example device 400 to form a reference electrode and perform a measurement using three example electrodes. Features and aspects of other devices disclosed herein may be used with the device 400. Like reference numerals denote like components and redundant description is omitted for clarity.

The device 400 includes a processor 102 and a set of electrodes 402.

The set of electrodes 402 includes a first electrode 406, a second electrode 408, and a third electrode 404. The first electrode 406 may be controlled by the processor 102 to operate as a working electrode. The third electrode 404 may be controlled by the processor 102 to operate as a counter electrode. The second electrode 408 may be manufactured as an incomplete reference electrode to be completed at time of use. The second and third electrodes 408, 404 may be shaped to form a broken loop and the first electrode 406 may be situated within the broken loop. An ion-selective membrane may be provided to any of the first electrode 406 and the third electrode 404 to facilitate measurement of a biological, biochemical, or chemical component of a fluid in contact with the set of electrodes 402.

The set of electrodes 402 may be disposed on a substrate 412, which may define a microfluidic volume 410 into which fluid, such as fluid containing chloride ions, may be introduced.

The device 400 may further include an input/output interface 414 to connect the set of electrodes 402 to the processor 102. The input/output interface 414 may output an electrical potential to the set of electrodes 402 based on a signal received from the processor 102 to transform the second electrode 408 into a reference electrode. Subsequently, the input/output interface 414 may receive a signal from the set of electrodes 402 and provide a corresponding signal to the processor 102 to perform a measurement using the reference electrode. Hence, the input/output interface 414 may both provide a bias voltage to form the reference electrode and obtain measurements using the reference electrode.

Formation of the second electrode 408 into the reference electrode may be facilitated by providing a silver metal surface 416 to the second electrode 408 and then, prior to use when a fluid containing chloride ions is present in the volume 410, applying an electrical potential between the second electrode 408 and the first electrode 406, the third electrode 404, or both, to cause formation of silver chloride at the silver metal surface 416.

Reference electrode forming instructions 418 may be provided to be executed by the processor 102 to form the reference electrode. Measurement process instructions 420 may be provided to be executed by the processor 102 to use the newly formed reference electrode to perform a measurement.

Figure 5:
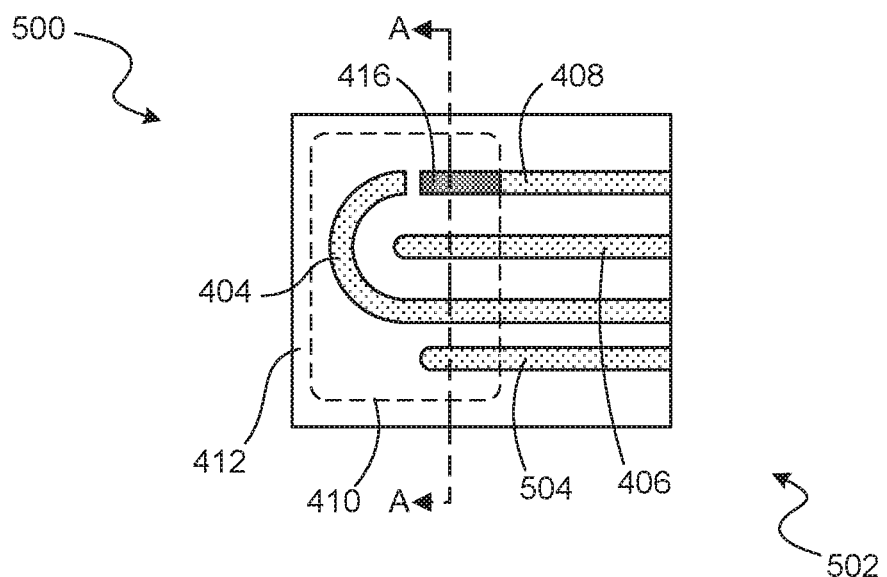
FIG. 5 is a schematic diagram of an example device to form a reference electrode and perform a measurement using four example electrodes.

FIG. 5 shows an example device 500 to form a reference electrode and perform a measurement using four example electrodes. Features and aspects of other devices disclosed herein may be used with the device 400. Like reference numerals denote like components and redundant description is omitted for clarity.

A set of electrodes 502 may be disposed on a substrate 412, which may define a microfluidic volume 410 into which fluid, such as fluid containing chloride ions, may be introduced.

The set of electrodes 502 includes a first electrode 406, a second electrode 408, and a third electrode 404. The first electrode 406 may be a working electrode. The third electrode 404 may be a counter electrode. The second electrode 408 may be manufactured as an incomplete reference electrode to be completed at time of use by electrochemical deposition of silver chloride on a silver metal surface 416 located within the microfluidic volume 410.

A fourth electrode 504 may be provided to the microfluidic volume 410. The fourth electrode 504 may be dedicated to providing an electrical potential with the second electrode 408 to convert the second electrode 408 into the reference electrode. The fourth electrode 504 may be considered a cathode that is used to anodize the second electrode 408. The fourth electrode 504 may be the only cathode used to anodize the second electrode 408. Hence, use of the working and counter electrodes 406, 404 to finish the reference electrode may be avoided, which may reduce or eliminate contamination or degradation of these electrodes 406, 404.

Figure 6:
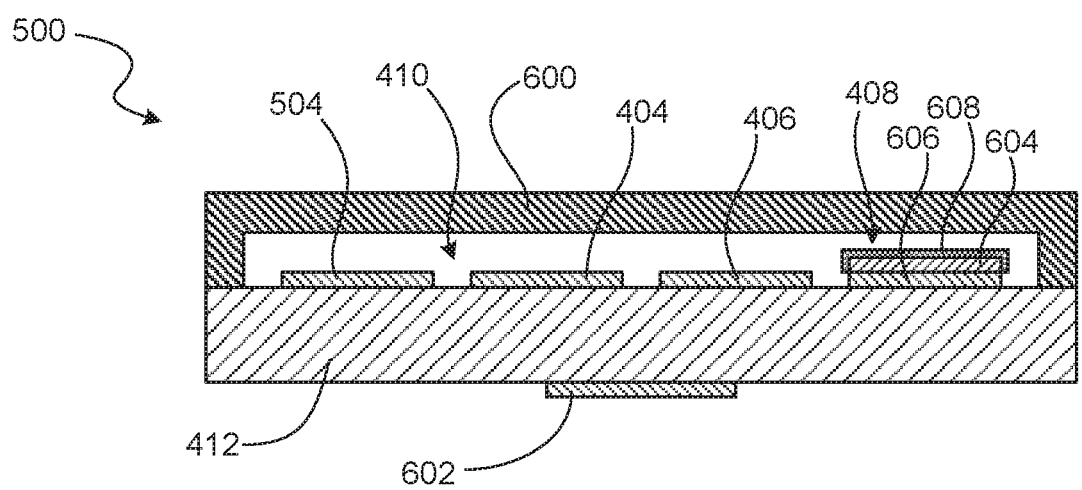
FIG. 6 is a cross-sectional view of the example device of FIG. 5.

FIG. 6 shows the example device 500 in section. Electrodes 504, 404, 406, 408 may be deposited on a substrate 412. A layer of photoresist 600, such as SU-8 photoresist, may be applied to the substrate 412 to form a microfluidic volume 410, in which the electrodes 504, 404, 406, 408 are positioned. A heater 602 may be provided to the substrate 412 on, for example, a side opposite the side on which the electrodes 504, 404, 406, 408 are disposed. The heater 602 may include a field-effect transistor (FET), a silicon resistor, a metallic or other conductive thin film electrical heater, a temperature sensing resistor (TSR), or similar. The heater 602 may be used to apply thermal cycling, such as that used in PCR. The thickness of the substrate 412 may be selected to increase or decrease its thermal mass, with a thinner substrate allowing for higher frequency temperature cycling. A second electrode 408 may include a metal silver layer 604 that is disposed on an electrically conductive base material 606, such as gold. The metal silver layer 604 may be covered by silver chloride 608 to form a silver/silver chloride reference electrode.

Figure 7:
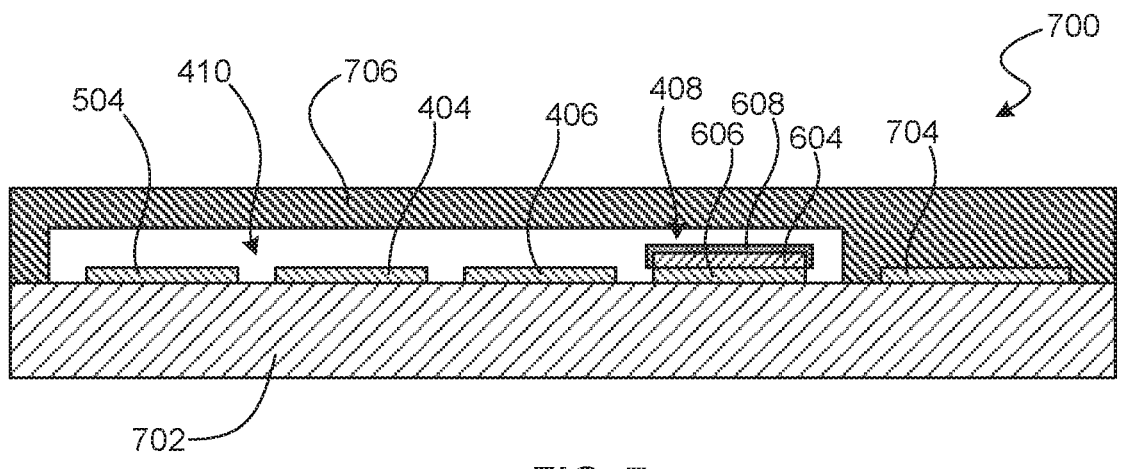
FIG. 7 is a cross-sectional view of another example device to form a reference electrode and perform a measurement using four example electrodes.

FIG. 7 shows another example device 700 in section. Features and aspects of other devices disclosed herein may be used with the device 700. Like reference numerals denote like components and redundant description is omitted for clarity.

Electrodes 504, 404, 406, 408 may be deposited on a substrate 702. A second electrode 408 may include a metal silver layer 604 that overlies a portion of an electrically conductive base material 606, such as gold, and that is covered by silver chloride 608 to form a silver/silver chloride reference electrode. A heater 704 may be provided to the substrate 702 on, for example, the same side on which the electrodes 504, 404, 406, 408 are disposed. The heater 704 may be similar to the heater 602 discussed above. A layer of photoresist 706, such as SU-8 photoresist, may be applied to the substrate 702 to form a microfluidic volume 410, in which the electrodes 504, 404, 406, 408 are positioned.

Figure 8A:
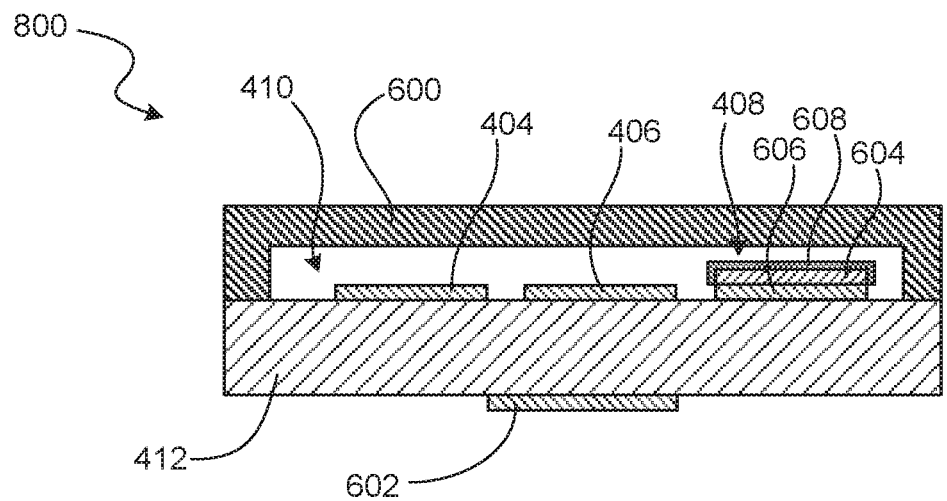
FIG. 8A is a cross-sectional view of another example device to form a reference electrode and perform a measurement using three example electrodes.

FIG. 8A shows an example device 800 in section. Features and aspects of other devices disclosed herein may be used with the device 800. Like reference numerals denote like components and redundant description is omitted for clarity. The device 800 is similar to the device 500 with the fourth electrode 504, or cathode specifically to anodize the reference electrode, being omitted.

Figure 8B:
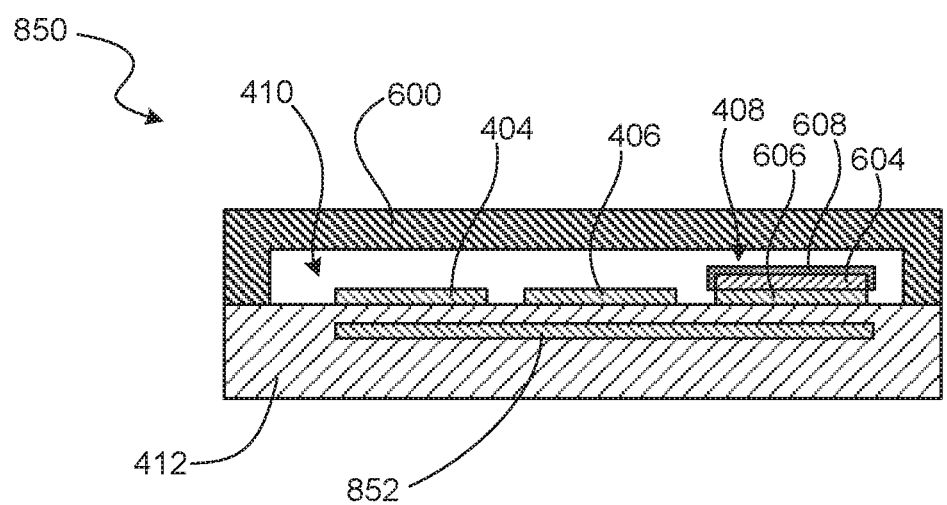
FIG. 8B is a cross-sectional view of another example device to form a reference electrode and perform a measurement using three example electrodes, wherein a heater is embedded in a substrate.

FIG. 8B shows an example device 850 in section. Features and aspects of other devices disclosed herein may be used with the device 850. Like reference numerals denote like components and redundant description is omitted for clarity. The device 850 is similar to the device 500 with the fourth electrode 504, or cathode specifically to anodize the reference electrode, being omitted. Further, the device 850 includes a heater 852 that is embedded in a substrate 412 that carries the electrodes 404, 406, 408. Embedding the heater 852 in the substrate 412 may allow for selection of an effective thermal mass of the substrate 412 with regard to a desired thermal cycling frequency.

FIGS. 9A-9I show an example method to manufacture a microfluidic device, form a reference electrode, and then perform a measurement with the newly-formed reference electrode.

As shown in FIG. 9A, a set of electrodes 900 may be formed on a substrate 902. Forming the set of electrodes 900 may include deposition of a thin film of a material, such as gold, onto a silicon substrate. A mask 904 with appropriate cutouts may be used. An ion-selective membrane may be provided to any electrode of the set of electrodes 900 to facilitate measurement of a biological, biochemical, or chemical component of a fluid that will be brought into contact with the set of electrodes 900.

Then, as shown in FIG. 9B, a mask 906 for deposition of silver metal may be provided. The mask 906 may have a cutout that overlaps a portion of a cutout of the first mask 904.

Then, as shown in FIG. 9C, a layer of silver metal 908 may be deposited onto an electrode 910 of the set 900 using the mask 906. That is, a layer of silver metal 908 may be deposited onto a portion of an electrically conductive base material of the electrode 910.

Then, as shown in FIG. 9D, an electrically insulative layer 912 may be deposited over portions of the electrodes that are not to come into contact with fluid.

Subsequently, as shown in FIG. 9E, a microfluidic component 914 may be provided. The microfluidic component 914 may define a volume 916 that is open to the set of electrodes 900. The microfluidic component 914 may be fabricated directly on the substrate 902 or pre-fabricated and then attached to the substrate 902.

Then, as shown in FIG. 9F, the set of electrodes 900 may be connected to a circuit 918. Before or after connection of the circuit 918, the device with its unfinished reference electrode 910 may be packaged as a single-use or consumable device, shipped, sold, and stored for a duration of time.

As shown in FIG. 9G, the device is put into use and fluid may be introduced into the volume 916 defined by the microfluidic component 914 via an inlet conduit 920 of the microfluidic component 914. The fluid may contain chloride ions.

As shown in FIG. 9H, the circuit 918 may be energized to provide an electrical potential to the set of electrodes 900. The unfinished reference electrode 910 may be positively biased with respect to another electrode, so as to anodize the reference electrode 910 with silver chloride to produce a finished silver/silver chloride reference electrode. For example, a current of 5-200 mA per square centimeter of silver metal 908 may be applied for several seconds. Comparison of an exponential decay of applied current to a threshold current, or similar technique, may be used to determined sufficient deposition of silver chloride. An example threshold current may be set to between 10 and 100 times lower than an initial current resulting from a constant applied voltage of, for example, 1-2 V, which may occur within approximately 20 seconds. After completion of the reference electrode 910, application of the electrical potential may be ceased.

Then, as shown in FIG. 9I, the circuit 918 may be used to take a measurement with reference to the now completed silver/silver chloride reference electrode 910. The fluid in the volume 916 may remain during the measurement and may undergo chemical, biological, or biochemical change. A different fluid may be provided to the volume 916. For example, a nucleic acid amplification process may be performed with the volume 916 and a product may be electrochemically measured or detected using the set of electrodes 900 including the silver/silver chloride reference electrode 910.

Experimental Example

A PCR master mix was used to fabricate an example silver/silver chloride reference electrode and determine viability of master mix components after the anodization process in chloride ion containing solution as a proof-of-concept for in situ fabrication and operation of a reference electrode.

A device included three electrodes, one electrode made of silver exposed to the master mix which included 3 mM magnesium chloride ($MgCl_2$). The master mix further included deoxyribonucleotide triphosphate (dNTPs) and polymerase. DNA template and primers were added to the master mix solution prior to the anodization process. Three solutions were prepared: (1) DNA target positive control, (2) non-template control, (3) DNA test solution. Solutions 1 and 2 were used as controls not exposed to the chloriding process. Solution 3 was used to anodize a silver wire. An anodic potential of 1 V was applied to the silver electrode with reference to counter electrode for 10 seconds. A surrogate silver/silver chloride (Ag/AgCl) reference electrode formed with less than ±20 mV deviation with respect to a standard off-the-shelf liquid silver/silver chloride reference electrode.

Figure 10A:
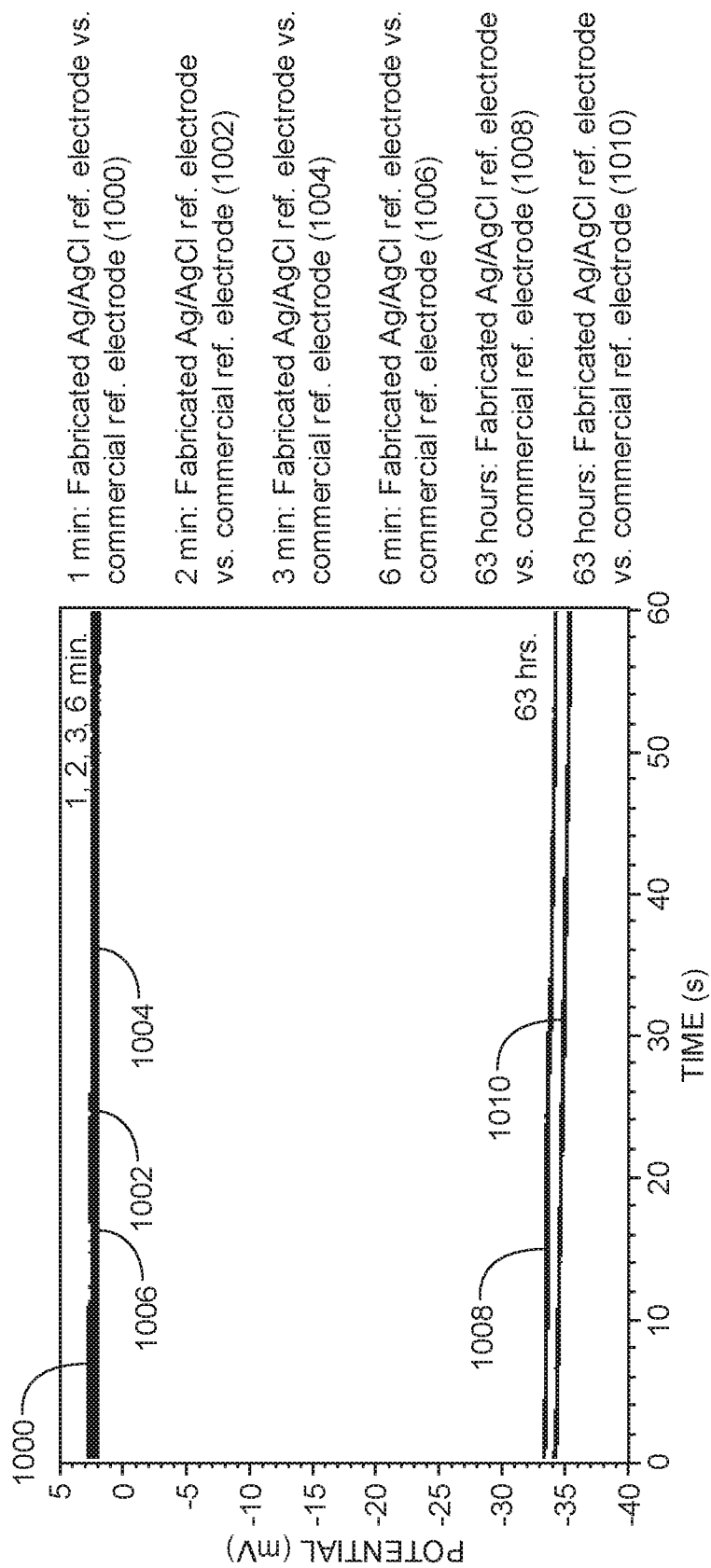
FIGS. 10A and 10B are graphs of potential for an in situ formed reference electrode with respect to a conventional reference electrode.
Figure 10B:
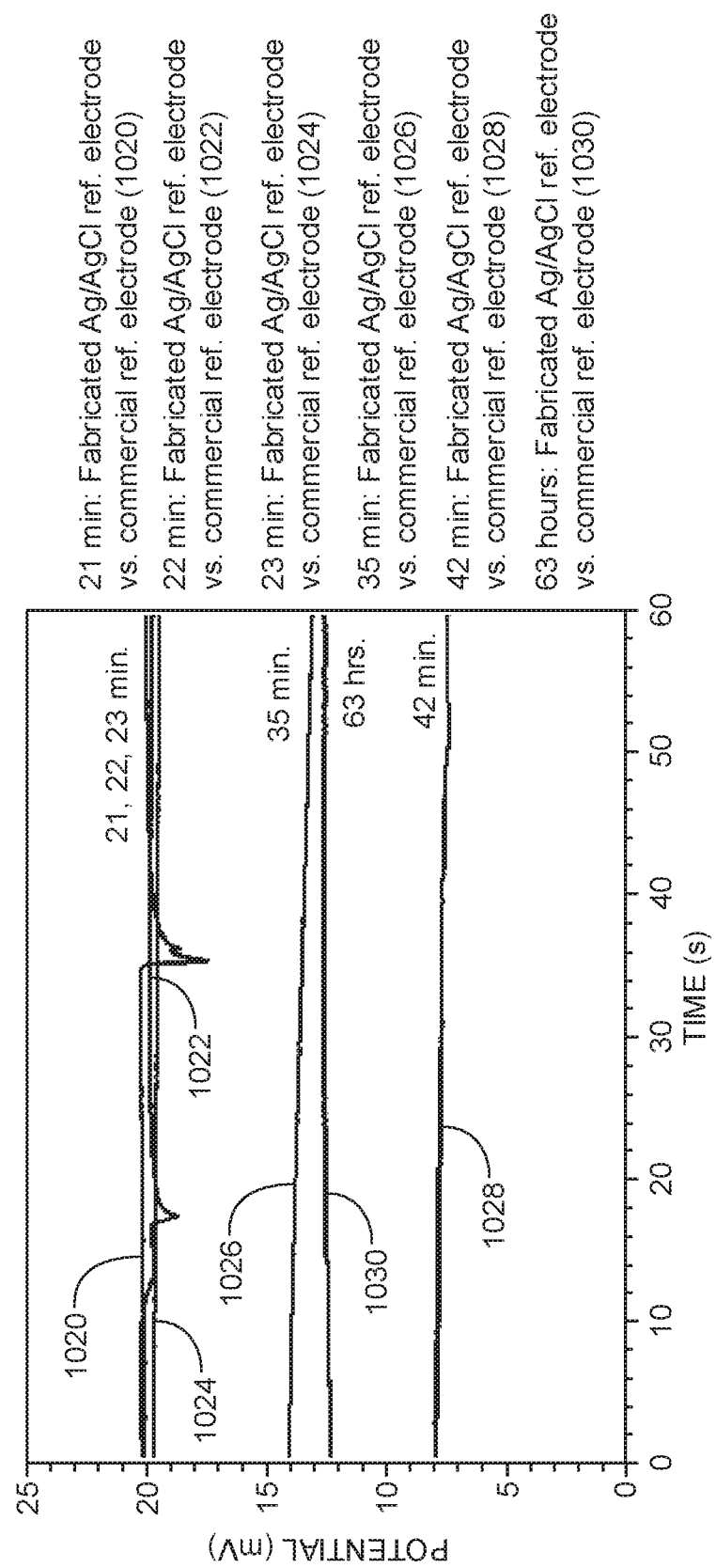

The Ag/AgCl reference electrode fabricated in master mix was stable and had a small potential difference from the commercial miniature Ag/AgCl reference electrode. FIG. 10A shows the potential difference between the fabricated Ag/AgCl reference electrode and commercial reference electrode stored in NaCl (3 M). Measurement of potential difference is shown by curve segments 1000, 1002, 1004, 1006, 1008, and 1010 for elapsed times of 1 minute, 2 minutes, 3 minutes, 6 minutes, 63 hours, and after 63 hours, respectively. FIG. 10B shows the potential difference between the fabricated Ag/AgCl reference electrode and commercial reference electrode stored in KCl (1 M). Measurement of potential difference is shown by curve segments 1020, 1022, 1024, 1026, 1028, and 1030 for elapsed times of 21 minutes, 22 minutes, 23 minutes, 35 minutes, 42 minutes, and 63 hours, respectively. Each test solution showed that the fabricated reference electrode was stable and within 21 mV of the commercial reference electrode under short-term storage conditions. The Ag/AgCl reference electrode had less than 3 mV potential difference from the commercial miniature reference electrode in NaCl immediately after fabrication (1-6 min after fabrication). The potential difference was slightly higher in KCl (21-35 min after fabrication), but equilibrated to 7 mV potential difference 42 min after fabrication in KCl. The reference electrode showed stability immediately after fabrication.

Figure 11:
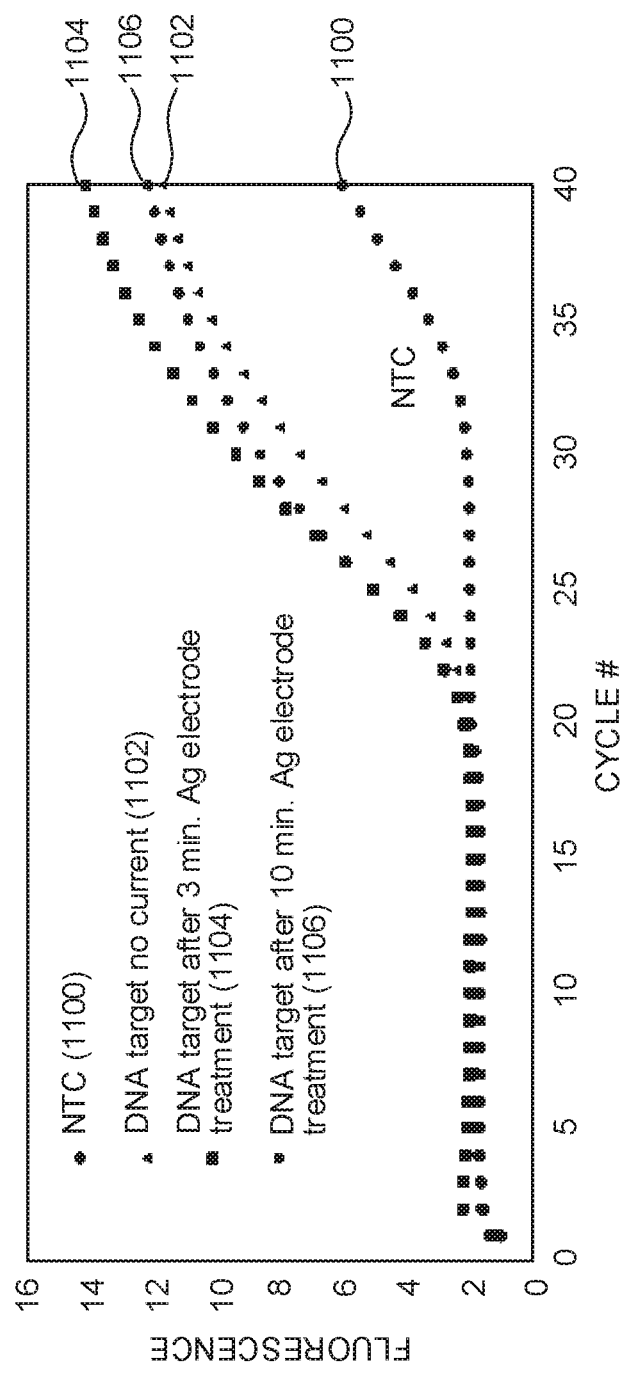
FIG. 11 is a graph of relative fluorescence as a function of cycle number for reactions using an in situ formed reference electrode.

FIG. 11 shows a PCR plot of relative fluorescence as a function of cycle number for the four PCR reactions (solutions 1, 2, and solution 3—after 3 and 10 min of anodization). Non-template control (NTC) and DNA target with no current were controls not used in chloriding the silver/silver chloride reference electrode, shown by plotted datasets 1100 and 1102, respectively. Plotted datasets 1104 and 1106 show amplification of aliquots taken from the master mix used to fabricate the silver/silver chloride reference electrode after 3 and 10 minutes, respectively. Late amplification was shown in the NTC. The three PCR reactions containing template DNA amplified as expected, around cycle 22. As shown in FIG. 11, there was no delay in amplification for PCR reactions used in fabrication of the reference electrode compared to the positive control (solution 2: salmonella no current). Therefore, there was little to no loss in master mix viability due to in situ fabrication of the silver/silver chloride reference electrode.

Although formation of a silver/silver chloride reference electrode is described in detail herein, it is contemplated that an electrode having an exposed surface of another metal may be anodized in situ using another anion containing fluid using the same or similar techniques as described herein to obtain another type of electrode. Such anion containing fluid may contain any one or mixture of anions such as chloride, oxygen, hydroxide, bromide, and the like.

In view of the above, it should be apparent that a silver/silver chloride reference electrode may be partially fabricated at time of manufacture and then completed prior to use. This may reduce degradation due to light sensitivity or chloride leakage. Further, a fluid used in a measurement process, such as a PCR master mix, may be used as a source of chloride ions to complete fabrication of the silver/silver chloride reference electrode. Fabrication may be simplified, in that microfluidic components and electrodes may be made at time of manufacture without use of a source of chloride ions, such as high concentration hydrochloric acid. A partially fabricated silver/silver chloride reference electrode may be integrated directly onto a microfluidic substrate to be completed subsequently during a microfluidic process.

It should be recognized that features and aspects of the various examples provided above may be combined into further examples that also fall within the scope of the present disclosure.

The invention claimed is:

1. A device comprising:
    a processor to connect to an electrode disposed within a microfluidic volume and to connect to a second electrode that includes a surface of silver metal disposed within the microfluidic volume;
    a set of electrode-forming instructions that is executable by the processor to cause the processor to apply an electrical potential between the electrode and the second electrode when the microfluidic volume contains a fluid that includes a polymerase chain reaction master mix that contains chloride ions to form a layer of silver chloride on the surface of the second electrode, the set of electrode-forming instructions further to cause the processor to cease application of the electrical potential; and
    a set of measurement-process instructions that is executable by the processor to cause the processor to operate the second electrode as a reference electrode in a measurement process performed within the microfluidic volume with the polymerase chain reaction master mix.

2. The device of claim 1, wherein the processor is further to operate a working electrode with respect to the second electrode as the reference electrode.

3. The device of claim 2, wherein the processor is further to operate the electrode as the working electrode with respect to the second electrode as the reference electrode.

4. The device of claim 1, wherein the processor is to control the measurement process to use the fluid to provide a reagent after formation of the reference electrode using the fluid.

5. The device of claim 1, wherein the measurement process is a nucleic acid amplification process.

6. A device comprising:
    a substrate;
    an electrode disposed on the substrate;
    an incomplete reference electrode disposed on the substrate, the incomplete reference electrode including an electrically conductive base material and an exposed metal layer overlying the electrically conductive base material;
    a microfluidic volume in which the electrode and the incomplete reference electrode are disposed; and
    a processor configured to introduce an anion containing fluid for a nucleic acid amplification process into the microfluidic volume and apply an electrical bias between the electrode and the incomplete reference electrode to anodize the exposed metal layer to complete the reference electrode;
    the processor further configured to use the fluid, the electrode, and the completed electrode to perform the nucleic acid amplification process.

7. The device of claim 6, wherein the exposed metal layer includes a silver metal layer, wherein the anion containing fluid includes chloride ions, and wherein the reference electrode is a silver/silver chloride reference electrode.

8. The device of claim 6, further comprising a working electrode disposed on the substrate and in the microfluidic volume.

9. The device of claim 6, further comprising a pump to draw the fluid into the microfluidic volume.

10. The device of claim 9, wherein the pump includes a droplet ejector nozzle.

11. A method comprising:

forming an electrode;

forming an incomplete reference electrode including silver metal;

forming a microfluidic volume into which the electrode and the incomplete reference electrode are disposed; and providing processor-executable instructions to apply an electrical potential between the electrode and the incomplete reference electrode, when the microfluidic volume contains a fluid that includes a reagent for a nucleic acid amplification process that contains chloride ions, to form a layer of silver chloride on a surface of the incomplete reference electrode to form a complete reference electrode, the instructions further to cease application of the electrical potential and perform a measurement process of the nucleic acid amplification process with the fluid using the electrode and the complete reference electrode.

12. The method of claim 11, wherein the fluid includes a polymerase chain reaction master mix.

* * * * *